United States Patent
Yada et al.

(10) Patent No.: US 9,196,924 B2
(45) Date of Patent: Nov. 24, 2015

(54) SOLID ELECTROLYTE MATERIAL, LITHIUM BATTERY, AND METHOD OF PRODUCING SOLID ELECTROLYTE MATERIAL

(75) Inventors: Chihiro Yada, Susono (JP); Hiroshi Suyama, Mishima (JP); Shoji Yokoishi, Mishima (JP); Brian Elliott Hayden, Hampshire (GB); Thierry Le Gall, Southampton (GB); Duncan Clifford Alan Smith, Hampshire (GB); Christopher Edward Lee, Southampton (GB)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 380 days.

(21) Appl. No.: 13/640,371

(22) PCT Filed: Apr. 13, 2010

(86) PCT No.: PCT/JP2010/056605
§ 371 (c)(1),
(2), (4) Date: Dec. 7, 2012

(87) PCT Pub. No.: WO2011/128977
PCT Pub. Date: Oct. 20, 2011

(65) Prior Publication Data
US 2013/0071756 A1 Mar. 21, 2013

(51) Int. Cl.
*H01M 10/0562* (2010.01)
*H01M 10/0563* (2010.01)
*H01B 1/06* (2006.01)
*H01M 10/052* (2010.01)

(52) U.S. Cl.
CPC ............. *H01M 10/0562* (2013.01); *H01B 1/06* (2013.01); *H01M 10/052* (2013.01); *H01M 10/0563* (2013.01); *Y02E 60/122* (2013.01)

(58) Field of Classification Search
CPC .................................................. H01M 10/0562
USPC .......................................... 429/317, 319, 322
See application file for complete search history.

(56) References Cited

U.S. PATENT DOCUMENTS

| | | | |
|---|---|---|---|
| 2004/0018424 A1* | 1/2004 | Zhang et al. | .................. 429/162 |
| 2004/0058237 A1* | 3/2004 | Higuchi et al. | ............... 429/209 |
| 2012/0237835 A1 | 9/2012 | Yada et al. | |

FOREIGN PATENT DOCUMENTS

| | | |
|---|---|---|
| JP | A-6-333577 | 12/1994 |
| JP | A-9-219215 | 8/1997 |
| JP | A-11-79746 | 3/1999 |
| JP | A-2008-59843 | 3/2008 |
| JP | A-2009-238704 | 10/2009 |
| JP | A-2011-222415 | 11/2011 |
| WO | WO 2011/128976 A1 | 10/2011 |

\* cited by examiner

*Primary Examiner* — Stewart Fraser
*Assistant Examiner* — Rachel Zhang
(74) *Attorney, Agent, or Firm* — Oliff PLC

(57) ABSTRACT

A main object of the present invention is to provide a solid electrolyte material having excellent Li ion conductivity. To attain the object, the present invention provides a solid electrolyte material represented by a general formula: $Li_x(La_{2-a}M1_a)(Ti_{3-b}M2_b)O_{9+\delta}$, characterized in that "x" is $0<x\leq1$; "a" is $0\leq a\leq2$; "b" is $0\leq b\leq3$; "δ" is $-2\leq\delta\leq2$; "M1" is at least one selected from the group consisting of Sr, Na, Nd, Pr, Sm, Gd, Dy, Y, Eu, Tb, and Ba; and "M2" is at least one selected from the group consisting of Mg, W, Mn, Al, Ge, Ru, Nb, Ta, Co, Zr, Hf, Fe, Cr, and Ga.

13 Claims, 2 Drawing Sheets

SOLID ELECTROLYTE MATERIAL, LITHIUM BATTERY, AND METHOD OF PRODUCING SOLID ELECTROLYTE MATERIAL

TECHNICAL FIELD

The present invention relates to a solid electrolyte material having excellent Li ion conductivity.

BACKGROUND ART

In accordance with a rapid spread of information relevant apparatuses and communication apparatuses such as a personal computer, a video camera and a portable telephone in recent years, as a power source thereof the development of a battery to be utilized has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery.

A Li—La—Ti—O-based solid electrolyte material (LLT) has been known as a solid electrolyte material used for an all solid state lithium battery. For example, in Patent Literature 1, a solid electrolyte membrane having lithium ion conductivity is disclosed, which has a composition of $La_xLi_yTi_zO_3$ ($0.4 \leq X \leq 0.6$, $0.4 \leq Y \leq 0.6$, $0.8 \leq Z \leq 1.2$, $Y<X$) and is an amorphous structure.

Further, in Patent Literature 2, a solid electrolyte layer composed of a solid electrolyte comprising a complex oxide containing Li, La and Ti is disclosed, which has an amorphous layer, a crystalline layer and a lattice defect layer. In addition, in Patent Literature 2, it is described that the composition of a solid electrolyte material is preferably $La_{2/3-x}Li_{3x}TiO_3$ ($0.03 \leq x \leq 0.167$). This solid electrolyte material is synthesized by performing planetary ball milling and burning, and corresponds to so-called bulk body, not a thin membrane.

Further, in Patent Literature 3, a perovskite type complex oxide represented by $Li_xLa_yTi_zO_3$ (x, y, z satisfy $0.08 \leq x \leq 0.75$, $0.8 \leq z \leq 1.2$, $x+3y+4z=6$) is disclosed. Further, in Examples of Patent Literature 4, a lithium ion conductor represented by $Li_{0.34}La_{0.51}TiO_{2.94}$ is disclosed. Further, in Examples of Patent Literature 5, a perovskite type oxide represented by $Li_{0.26}La_{0.57}TiO_3$ is disclosed.

CITATION LIST

Patent Literature

Patent Literature 1: Japanese Patent Application Laid-Open (JP-A) No. 2009-238704
Patent Literature 2: JP-A No. 2008-059843
Patent Literature 3: JP-A No. H11-079746
Patent Literature 4: JP-A No. H06-333577
Patent Literature 5: JP-A No. H09-219215

SUMMARY OF INVENTION

Technical Problem

A solid electrolyte material having excellent Li ion conductivity has been demanded from the viewpoint of achieving higher output of a battery. The present invention has been made in view of the above-mentioned actual circumstances, and a main object thereof is to provide a solid electrolyte material having excellent Li ion conductivity.

Solution to Problem

To attain the object, the present invention provides a solid electrolyte material represented by a general formula: $Li_x(La_{2-a}M1_a)(Ti_{3-b}M2_b)O_{9+\delta}$, characterized in that "x" is $0<x \leq 1$; "a" is $0 \leq a \leq 2$; "b" is $0 \leq b \leq 3$; "$\delta$" is $-2 \leq \delta \leq 2$; "M1" is at least one selected from the group consisting of Sr, Na, Nd, Pr, Sm, Gd, Dy, Y, Eu, Tb, and Ba; and "M2" is at least one selected from the group consisting of Mg, W, Mn, Al, Ge, Ru, Nb, Ta, Co, Zr, Hf, Fe, Cr, and Ga.

A solid electrolyte material having excellent Li ion conductivity may be obtained for the reason that the present invention has the above-mentioned general formula.

In the above-mentioned present invention, the above-mentioned "x" is preferably $0.02 \leq x \leq 0.28$. The reason therefor is to allow a solid electrolyte material having more excellent Li ion conductivity.

In the above-mentioned present invention, the above-mentioned "x" is preferably $0.09 \leq x \leq 0.24$. The reason therefor is to allow a solid electrolyte material having remarkably high Li ion conductivity.

In the above-mentioned present invention, the solid electrolyte material is preferably a crystalline material. The reason therefor is that Li ion conductivity in a crystal grain is high. In the present invention, for example, the use of a reactive deposition method allows crystal grains to be favorably joined to each other and allows resistance increase in a grain boundary to be restrained even in the case of being a crystalline material.

In the above-mentioned present invention, the solid electrolyte material preferably has a perovskite structure. The reason therefor is to allow a solid electrolyte material having high Li ion conductivity.

In the above-mentioned present invention, the solid electrolyte material is preferably in thin film form. For example, the reason therefor is that the use of a reactive deposition method allows the minute solid electrolyte material to be obtained and allows Li ion conductivity to be improved.

In the above-mentioned present invention, the solid electrolyte material preferably has a thickness of 200 nm to 5 μm.

In the above-mentioned present invention, the "a" and the "b" are preferably 0.

Further, the present invention provides a lithium battery comprising: a cathode active material layer containing a cathode active material, an anode active material layer containing an anode active material, and a solid electrolyte layer formed between the above-mentioned cathode active material layer and the above-mentioned anode active material layer, characterized in that the above-mentioned solid electrolyte layer contains the above-mentioned solid electrolyte material.

According to the present invention, the use of the above-mentioned solid electrolyte material allows a high-output lithium battery.

Further, the present invention provides a method of producing a solid electrolyte material, including steps of: preparing a raw material, in which the raw material is made of Li, La, Ti, M1 (M1 being at least one selected from the group consisting of Sr, Na, Nd, Pr, Sm, Gd, Dy, Y, Eu, Tb, and Ba), and M2 (M2 being at least one selected from the group consisting of Mg, W, Mn, Al, Ge, Ru, Nb, Ta, Co, Zr, Hf, Fe, Cr, and Ga); and forming a thin film, in which the solid electrolyte material is formed using the raw material to a substrate by a reactive deposition method using oxygen, and the solid electrolyte material is represented by a general formula: $Li_x(La_{2-a}M1_a)(Ti_{3-b}M2_b)O_{9+\delta}$, in which "x" is $0<x\leq1$; "a" is $0\leq a\leq2$; "b" is $0\leq b\leq3$; "$\delta$" is $-2\leq\delta\leq2$.

According to the present invention, the use of the reactive deposition method allows a minute thin film to be formed, and a solid electrolyte material having excellent Li ion conductivity may be obtained by the above-mentioned general formula.

In the above-mentioned present invention, the above-mentioned "x" is preferably $0.02\leq x\leq0.28$. The reason therefor is to allow a solid electrolyte material having more excellent Li ion conductivity.

In the above-mentioned present invention, it is preferable that the above-mentioned solid electrolyte material is a crystalline material and has a perovskite structure. The reason therefor is to allow a solid electrolyte material having high Li ion conductivity.

In the above-mentioned present invention, the solid electrolyte material preferably has a thickness of 200 nm to 5 μm. The reason therefor is that the minute solid electrolyte material may be obtained and Li ion conductivity may be improved.

In the above-mentioned present invention, the solid electrolyte material is preferably formed in the thin film forming step by the reactive deposition method using an oxygen plasma.

In the above-mentioned present invention, the substrate is preferably a member containing a cathode active material layer or an anode active material layer. The reason therefor is to be useful for producing a lithium battery.

Advantageous Effects of Invention

The present invention produces the effect such as to allow a solid electrolyte material having excellent Li ion conductivity.

DESCRIPTION OF EMBODIMENTS

A solid electrolyte material, a lithium battery and a method of producing a solid electrolyte material of the present invention are hereinafter described in detail.

A. Solid Electrolyte Material

A solid electrolyte material of the present invention is first described. A solid electrolyte material of the present invention is represented by a general formula: $Li_x(La_{2-a}M1_a)(Ti_{3-b}M2_b)O_{9+\delta}$, characterized in that "x" is $0<x\leq1$; "a" is $0\leq a\leq2$; "b" is $0\leq b\leq3$; "$\delta$" is $-2\leq\delta\leq2$; "M1" is at least one selected from the group consisting of Sr, Na, Nd, Pr, Sm, Gd, Dy, Y, Eu, Tb, and Ba; and "M2" is at least one selected from the group consisting of Mg, W, Mn, Al, Ge, Ru, Nb, Ta, Co, Zr, Hf, Fe, Cr, and Ga.

A solid electrolyte material having excellent Li ion conductivity may be obtained for the reason that the present invention has the above-mentioned general formula. Further, as described in the after-mentioned Examples, the determination of the specific range of "x" allows a solid electrolyte material having high Li ion conductivity (low activation energy).

Figure 1:
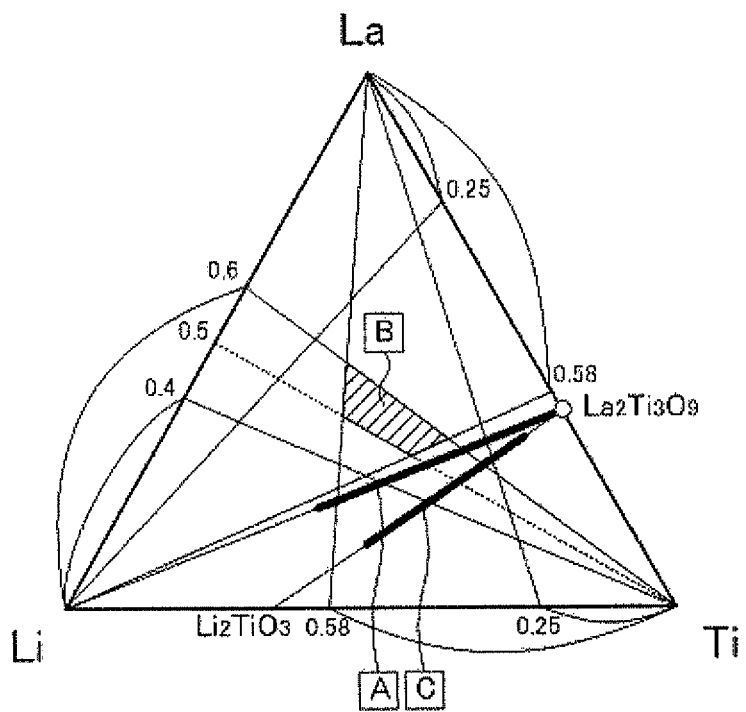
FIG. 1 is a ternary view explaining a solid electrolyte material of the present invention.

FIG. 1 is a ternary view explaining a solid electrolyte material of the present invention. With regard to a solid electrolyte material of the present invention, as shown in the above-mentioned general formula, part or all of La and part or all of Ti may be substituted with other metals (M1, M2); yet, in FIG. 1, the case where the solid electrolyte material is an Li—La—Ti—O-based solid electrolyte material is described for convenience. A solid electrolyte material of the present invention has a composition on a tie line of Li and $La_2Ti_3O_9$ as shown by the line segment A in FIG. 1. On the other hand, the solid electrolyte material described in Patent Literature 1 has a composition shown by the area B in FIG. 1 when numerical ranges of "x", "y", and "z" are shown in the ternary view. Similarly, the solid electrolyte material described in Patent Literature 2 has a composition shown by the line segment C in FIG. 1. The composition area (the area A) in the present invention differs completely from the composition areas shown by the area B and the line segment C, and is a new composition area which has not conventionally been known. As described in the after-mentioned Examples, it was confirmed that excellent Li ion conductivity was exhibited also in this new composition area.

A solid electrolyte material of the present invention is represented by a general formula: $Li_x(La_{2-a}M1_a)(Ti_{3-b}M2_b)O_{9+\delta}$. In the above-mentioned general formula, "x" is $0<x\leq1$. In the present invention, "x" is preferably $0.02\leq x$, and more preferably $0.09\leq x$. As described in the after-mentioned Examples, the reason therefor is to allow a solid electrolyte material having excellent Li ion conductivity. On the other hand, in the present invention, ordinarily, "x" is preferably $x\leq0.5$, more preferably $x\leq0.28$, and far more preferably $x\leq0.24$. The reason therefor is to allow a solid electrolyte material having excellent Li ion conductivity.

Further, in the above-mentioned general formula, "a" is $0\leq a\leq2$, and preferably $0\leq a\leq1$. Similarly, in the above-mentioned general formula, "b" is $0\leq b\leq3$, and preferably $0\leq b\leq1.5$. In the present invention, "a" or "b" may be 0, and "a" and "b" may be 0.

Further, in the above-mentioned general formula, "$\delta$" is $-2\leq\delta\leq2$. In consideration of valences of metallic elements included in the above-mentioned general formula, the above-mentioned general formula may be denoted as $Li_x(La_{2-a}M1_a)(Ti_{3-b}M2_b)O_{9+x/2}$ by the electroneutrality principle; yet, oxygen depletion and oxygen excess may be actually caused. In particular, in the case where a solid electrolyte material of the present invention is a crystalline material, oxygen deficiency such that oxygen is lost from an oxygen lattice and oxygen excess such that oxygen exists excessively by influence of a slight amount of an impurity phase are easily caused. Thus, in the present invention, the range of $\delta$ is prescribed at $-2\leq\delta\leq2$ in consideration of oxygen deficiency and oxygen excess.

Further, in the above-mentioned general formula, "M1" is a metal capable of being located at the same site as that of La in a crystal structure; specifically, at least one selected from the group consisting of Sr, Na, Nd, Pr, Sm, Gd, Dy, Y, Eu, Tb, and Ba.

Further, in the above-mentioned general formula, "M2" is a metal capable of being located at the same site as that of Ti in a crystal structure; specifically, at least one selected from the group consisting of Mg, W, Mn, Al, Ge, Ru, Nb, Ta, Co, Zr, Hf, Fe, Cr, and Ga.

A solid electrolyte material of the present invention may be amorphous or crystalline. The case of being amorphous has the advantage that resistance increase in a grain boundary may be prevented. On the other hand, the case of being crystalline has the advantage that Li ion conductivity in a crystal grain is high. In addition, in the present invention, the use of the after-mentioned reactive deposition method allows crystal grains to be favorably joined to each other and allows resistance increase in a grain boundary to be restrained even in the case of being crystalline. Further, a solid electrolyte material of the present invention preferably has a perovskite structure. The reason therefor is to allow a solid electrolyte material having high Li ion conductivity. In particular, a solid electrolyte material of the present invention is preferably a single-phase compound having a perovskite structure. The reason therefor is to allow Li ion conductivity to be made higher.

Further, a solid electrolyte material of the present invention may be bulky or in thin film form, and is preferably in thin film form. The reason therefor is that the use of the after-mentioned reactive deposition method allows a minute solid electrolyte material to be obtained and allows Li ion conductivity to be improved.

The size of a solid electrolyte material of the present invention is not particularly limited. Above all, in the case where a solid electrolyte material of the present invention is in thin film form, the thickness of the thin film is preferably 200 nm or more, more preferably 500 nm or more, and far more preferably 800 nm or more. On the other hand, the thickness of the thin film is preferably 5 μm or less, more preferably 3 μm or less, and far more preferably 2 μm or less.

Further, a solid electrolyte material of the present invention is preferably low in activation energy of Li ion conduction. The reason therefor is to allow a solid electrolyte material having high Li ion conductivity. The relation between Li ion conductivity and activation energy may be represented by the following expression.

$$\sigma = \sigma_0 \exp(-E/RT)$$

In the expression, $\sigma$ is Li ion conductivity (S/cm), $\sigma_0$ is total power term, E is activation energy (J/mol), R is gas constant, and T is absolute temperature (K).

As shown in the above-mentioned expression, smaller activation energy E brings larger Li ion conductivity $\sigma$. Activation energy may be expressed by a unit of [eV]. With regard to a solid electrolyte material of the present invention, activation energy is preferably 0.60 eV or less, more preferably 0.55 eV or less, and far more preferably 0.50 eV or less.

A solid electrolyte material of the present invention may be used for optional uses in which Li ion conductivity is required. Examples of the uses of the solid electrolyte material include batteries such as a lithium battery and sensors such as a gas sensor. A method of producing a solid electrolyte material of the present invention is described in detail in the after-mentioned 'C. Method of producing solid electrolyte material'. A solid electrolyte material in a bulk body may be produced by using a method such as a mechanical milling method and a solid phase method.

B. Lithium Battery

Next, a lithium battery of the present invention is described. A lithium battery of the present invention is a lithium battery comprising: a cathode active material layer containing a cathode active material, an anode active material layer containing an anode active material, and a solid electrolyte layer formed between the above-mentioned cathode active material layer and the above-mentioned anode active material layer, characterized in that the above-mentioned solid electrolyte layer contains the above-mentioned solid electrolyte material.

According to the present invention, the use of the above-mentioned solid electrolyte material allows a high-output lithium battery.

Figure 2:
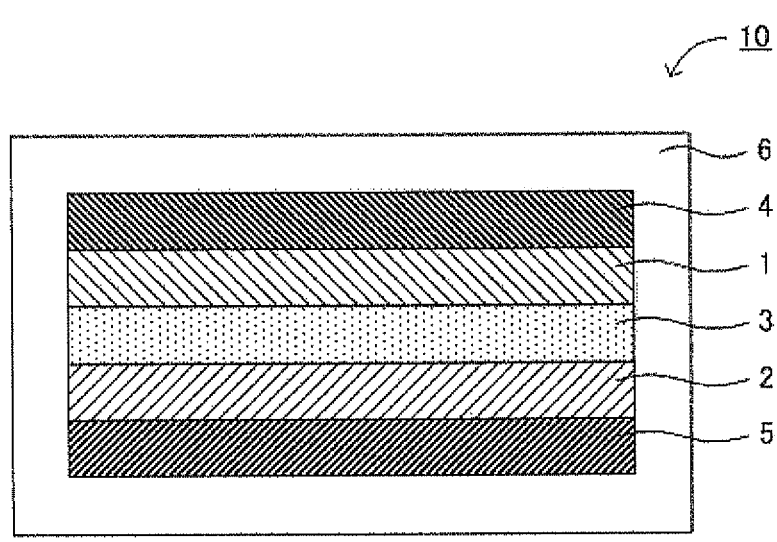
FIG. 2 is a schematic cross-sectional view showing an example of a lithium battery of the present invention.

FIG. 2 is a schematic cross-sectional view showing an example of a lithium battery of the present invention. A lithium battery 10 in FIG. 2 comprises: a cathode active material layer 1 containing a cathode active material, an anode active material layer 2 containing an anode active material, a solid electrolyte layer 3 formed between the cathode active material layer 1 and the anode active material layer 2, a cathode current collector 4 for performing current collecting of the cathode active material layer 1, an anode current collector 5 for performing current collecting of the anode active material layer 2, and a battery case 6 for storing these members. The present invention is greatly characterized in that the solid electrolyte layer 3 contains the solid electrolyte material described in the above-mentioned 'A. Solid electrolyte material'.

A lithium battery of the present invention is hereinafter described in each constitution.

1. Solid Electrolyte Layer

A solid electrolyte layer in the present invention is first described. A solid electrolyte layer in the present invention contains the above-mentioned solid electrolyte material. The range of the thickness of the solid electrolyte layer is preferably the same as the range of the thickness of the above-mentioned solid electrolyte material.

2. Cathode Active Material Layer

Next, a cathode active material layer in the present invention is described. A cathode active material layer in the present invention is a layer containing at least a cathode active material, and may contain at least one of a conductive material, a solid electrolyte material and a binder, as required. Examples of the cathode active material include $LiCoO_2$, $LiMnO_2$, $Li_2NiMn_3O_8$, $LiVO_2$, $LiCrO_2$, $LiFePO_4$, $LiCoPO_4$, $LiNiO_2$ and $LiNi_{1/3}CO_{1/3}Mn_{1/3}O_2$.

A cathode active material layer in the present invention may further contain a conductive material. The addition of the conductive material allows the conductivity of the cathode active material layer to be improved. Examples of the conductive material include acetylene black, Ketjen Black and carbon fiber. Further, the cathode active material layer may further contain a solid electrolyte material. The addition of the solid electrolyte material allows Li ion conductivity of the cathode active material layer to be improved. Examples of the solid electrolyte material include an oxide solid electrolyte material and a sulfide solid electrolyte material. Further, the cathode active material layer may further contain a binder. Examples of the binder include a fluorine-containing binder such as polytetrafluoroethylene (PTFE). The thickness of the cathode active material layer is preferably within a range of 0.1 μm to 1000 μm, for example.

3. Anode Active Material Layer

Next, an anode active material layer in the present invention is described. An anode active material layer in the present invention is a layer containing at least an anode active material, and may contain at least one of a conductive material, a solid electrolyte material and a binder, as required. Examples of the anode active material include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon.

A conductive material, a solid electrolyte material and a binder used for the anode active material layer are the same as in the case of the above-mentioned cathode active material layer. The thickness of the anode active material layer is preferably within a range of 0.1 μm to 1000 μm, for example.

4. Other Constitutions

A lithium battery of the present invention comprises at least the above-mentioned solid electrolyte layer, cathode active material layer and anode active material layer, ordinarily further comprising a cathode current collector for performing current collecting of the cathode active material layer and an anode current collector for performing current collecting of the anode active material layer. Examples of a material for the cathode current collector include SUS, aluminum, nickel, iron, titanium and carbon, and preferably SUS among them. On the other hand, examples of a material for the anode current collector include SUS, copper, nickel and carbon, and preferably SUS among them. Factors such as the thickness and shape of the cathode current collector and the anode current collector are preferably selected properly depending on the uses of a lithium battery. A battery case of a general lithium battery may be used for a battery case used for the present invention. Examples of the battery case include a battery case made of SUS.

5. Lithium Battery

A lithium battery of the present invention may be a primary battery or a secondary battery, and preferably a secondary battery among them. The reason therefor is to be repeatedly chargeable and dischargeable and be useful as a car-mounted battery, for example. Examples of the shape of a lithium battery of the present invention include a coin shape, a laminate shape, a cylindrical shape and a rectangular shape. A method of producing a lithium battery of the present invention is not particularly limited as long as it is a method for allowing the above-mentioned lithium battery, and the same method as that of producing a general lithium battery may be used. Examples thereof include a method such that a material constituting a cathode active material layer, a material constituting a solid electrolyte layer and a material constituting an anode active material layer are sequentially pressed to thereby produce a power generating element and this power generating element is stored inside a battery case, which is crimped.

C. Method of Producing Solid Electrolyte Material

Next, a method of producing a solid electrolyte material of the present invention is described. A method of producing a solid electrolyte material of the present invention comprises steps of: preparing a raw material, in which the raw material is constituted of Li, La, Ti, M1 (M1 being at least one selected from the group consisting of Sr, Na, Nd, Pr, Sm, Gd, Dy, Y, Eu, Tb, and Ba), and M2 (M2 being at least one selected from the group consisting of Mg, W, Mn, Al, Ge, Ru, Nb, Ta, Co, Zr, Hf, Fe, Cr, and Ga); and forming a thin film, in which the solid electrolyte material is formed using the raw material to a substrate by a reactive deposition method using oxygen, and the solid electrolyte material is represented by a general formula: $Li_x(La_{2-a}M1_a)(Ti_{3-b}M2_b)O_{9+\delta}$, in which "x" is $0<x\leq1$; "a" is $0\leq a\leq 2$; "b" is $0\leq b\leq 3$; and "δ" is $-2\leq\delta\leq 2$.

According to the present invention, the use of the reactive deposition method allows a minute thin film to be formed, and a solid electrolyte material having excellent Li ion conductivity may be obtained by the above-mentioned general formula.

Figure 3:
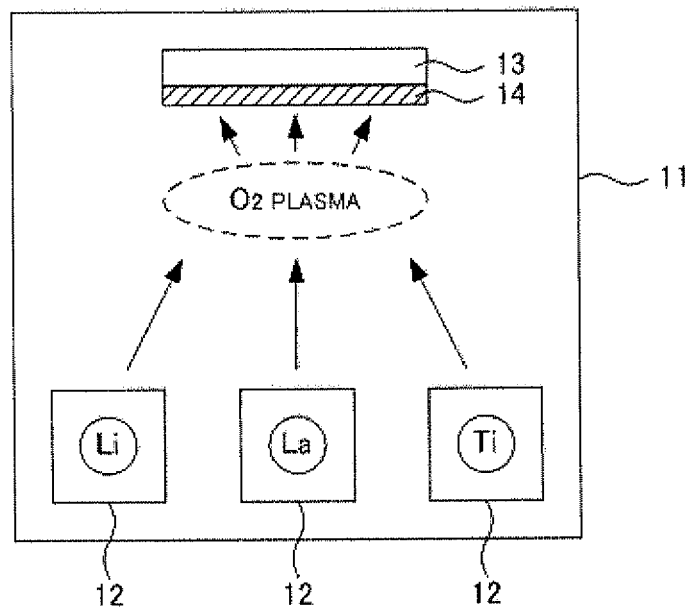
FIG. 3 is a schematic cross-sectional view showing an example of a method of producing a solid electrolyte material of the present invention.

FIG. 3 is a schematic cross-sectional view showing an example of a method of producing a solid electrolyte material of the present invention. In FIG. 3, a crucible 12 in which Li metal, La metal and Ti metal are put, and a substrate 13 are first placed in a chamber 11. Next, the pressure of the chamber 11 is reduced to form a vacuum state. Thereafter, $O_2$ plasma is caused to simultaneously volatilize Li metal, La metal and Ti metal by a resistance heating method and an electron beam method. Thus, an LiLaTiO thin film 14 is deposited on the substrate 13. A thin film with high amorphous nature is obtained if the substrate is not heated during the deposition, and a thin film with high crystallinity is obtained by heating the substrate during the deposition or post-heating a thin film deposited on the substrate.

A method of producing a solid electrolyte material of the present invention is hereinafter described at each step.

1. Step of Preparing Raw Material

The step of preparing a raw material in the present invention is first described. Step of preparing a raw material in the present invention is a step of preparing a raw material, in which the raw material is made of Li, La, Ti, M1 (M1 being at least one selected from the group consisting of Sr, Na, Nd, Pr, Sm, Gd, Dy, Y, Eu, Tb, and Ba), and M2 (M2 being at least one selected from the group consisting of Mg, W, Mn, Al, Ge, Ru, Nb, Ta, Co, Zr, Hf, Fe, Cr, and Ga).

In the present invention, simplex metals of Li, La, Ti, M1 and M2 are ordinarily prepared. These simplex metals have preferably high purity. The reason therefor is to allow a solid electrolyte material with fewer impurities. Further, ordinarily, M1 is not used in the case of obtaining a solid electrolyte material in which "a" in the above-mentioned general formula is 0, and M2 is not used in the case of obtaining a solid electrolyte material in which "b" in the above-mentioned general formula is 0.

2. Step of Forming Thin Film

Next, the step of forming a thin film in the present invention is described. The step of forming a thin film in the present invention is a step of forming the above-mentioned solid electrolyte material while using the above-mentioned raw material to a substrate by a reactive deposition method using oxygen.

In the present invention, the solid electrolyte material is formed by a reactive deposition method. In this method, the thin-film solid electrolyte material is formed by volatilizing the raw material to react the volatilized raw material with oxygen. Examples of a method of volatilizing the raw material include a resistance heating method and an electron beam method. Examples of a method of reacting the volatilized raw material with oxygen include a method of using oxygen plasma and a method of using oxygen gas. In addition, in the present invention, the reactive deposition is preferably performed in vacuo, and is preferably performed specifically in a vacuum of $1\times10^{-10}$ mBar or less. The reason therefor is that a minute thin film may be formed. The thickness of the solid electrolyte material may be controlled by deposition time.

Further, in the present invention, the thin-film solid electrolyte material is formed on the substrate. The substrate in the present invention is not particularly limited and preferably selected properly depending on the uses of the solid electrolyte material. For example, in the case of using the solid electrolyte material as a solid electrolyte layer of a lithium battery, a member having a cathode active material layer or an anode active material layer is preferably used as the substrate.

Further, in the present invention, the heating of the thin film formed on a substrate allows the solid electrolyte material with high crystallinity to be formed. Heating temperature is preferably a temperature of the crystallizing temperature or more of a crystal phase represented by the above-mentioned general formula; for example, within a range of 600° C. to 800° C. Heating time is preferably within a range of 0.5 hour to 3 hours, for example. Further, examples of a method of post-heating the thin film include a method by using a baking furnace, for example. In addition, an atmosphere for heating the thin film may be an air atmosphere or an inert gas atmosphere.

3. Others

A solid electrolyte material obtained by the present invention is the same content as that described in the above-mentioned 'A. Solid electrolyte material'; therefore, the description herein is omitted. The present invention may provide a solid electrolyte material characterized by being obtained by the above-mentioned method of producing a solid electrolyte material.

The present invention is not limited to the above-mentioned embodiments. The above-mentioned embodiments are exemplification, and any one that has substantially the same constitution as that of the technical idea described in the claim of the present invention and exerts similar effect is included in the technical scope of the present invention.

EXAMPLES

The present invention is described more specifically while showing Examples hereinafter.

Example 1

Lithium metal (ribbon, a purity of 99.9%, manufactured by Sigma-Aldrich Co. LLC.), lanthanum metal (a purity of 99.9%, manufactured by Sigma-Aldrich Co. LLC.), and titanium metal (slug, a purity of 99.98%, manufactured by Alfa Aesar) were first prepared as a raw material. Next, the lithium metal was put in a 40-cm$^3$ crucible made of pyrolytic boron nitride (PBN) and placed in a chamber. Next, the lanthanum metal and the titanium metal were each put in a 40-cm$^3$ crucible made of pyrolytic graphite and placed in the chamber in the same manner. An Si/SiO$_2$/Ti/Pt laminated body (manufactured by NOVA Electronic Materials, LLC.) was used as a substrate, a deposition area was determined at 0.785 cm$^2$ (equivalent to $\phi$ 10 mm), and a distance from the raw material to the substrate was determined at 500 mm. Next, the inside of the chamber was subject to a high vacuum of 1×10$^{-10}$ mBar or less.

Thereafter, resistance heating (Knudsen Cells) was performed for the crucible in which the lithium metal was put to volatilize the lithium, and simultaneously electron beam irradiation was performed for the crucible in which the lanthanum metal was put and the crucible in which the titanium metal was put to volatilize the lanthanum metal and the titanium metal. Oxygen plasma was caused in the chamber by using an oxygen plasma generator (manufactured by Oxford Applied Research Ltd., RF source, HD25) and reacted with the volatilized raw material to thereby obtain a thin-film solid electrolyte material on the substrate. The substrate was heated to a temperature of 700° C. during the deposition.

The thickness of the obtained solid electrolyte material was 410 nm. When XRD measurement (using CuKα) was performed for the obtained solid electrolyte material, it was confirmed that the solid electrolyte material was a crystalline material and had a perovskite structure. When ICP analysis (inductively coupled plasma analysis) was performed for the obtained solid electrolyte material, a result of Li:La:Ti=0.02:2:3 was obtained and it was confirmed that the composition of the obtained solid electrolyte material was $Li_{0.02}La_2Ti_3O_{9+\delta}$ (x=0.02).

Examples 2 to 7

A thin-film solid electrolyte material was obtained in the same manner as in Example 1 except for properly adjusting the amount of the metals volatilized from the crucible with a shutter. The composition of the solid electrolyte material obtained in Examples 2 to 7 was $Li_{0.9}La_2Ti_3O_{9+\delta}$ (x=0.09), $Li_{0.10}La_2Ti_3O_{9+\delta}$ (x=0.10), $Li_{0.11}La_2Ti_3O_{9+\delta}$ (x=0.11) $Li_{0.16}La_2Ti_3O_{9+\delta}$ (x=0.16), $Li_{0.24}La_2Ti_3O_{9+\delta}$ (x=0.24) and $Li_{0.28}La_2Ti_3O_{9+\delta}$ (x=0.28), respectively.

[Evaluation 1]

Activation energy of Li ion conduction in each of the solid electrolyte material obtained in Examples 1 to 7 was evaluated. Platinum was first deposited on the surface of the solid electrolyte material formed on the substrate to produce a symmetrical cell of Pt/solid electrolyte material/Pt. Next, an alternating current impedance method was performed at temperatures of 200 K, 250 K, 300 K, 350 K, 400 K, 450 K and 500 K to calculate activation energy of Li ion conduction. The result is shown in Table 1 and FIG. 4.

TABLE 1

| | CHEMICAL FORMULAE | ACTIVATION ENERGY |
|---|---|---|
| EXAMPLE 1 | $Li_{0.02}La_2Ti_3O_{9+\delta}$ (x = 0.02) | 0.58 eV |
| EXAMPLE 2 | $Li_{0.09}La_2Ti_3O_{9+\delta}$ (x = 0.09) | 0.54 eV |
| EXAMPLE 3 | $Li_{0.10}La_2Ti_3O_{9+\delta}$ (x = 0.10) | 0.54 eV |
| EXAMPLE 4 | $Li_{0.11}La_2Ti_3O_{9+\delta}$ (x = 0.11) | 0.53 eV |
| EXAMPLE 5 | $Li_{0.16}La_2Ti_3O_{9+\delta}$ (x = 0.16) | 0.47 eV |
| EXAMPLE 6 | $Li_{0.24}La_2Ti_3O_{9+\delta}$ (x = 0.24) | 0.53 eV |
| EXAMPLE 7 | $Li_{0.28}La_2Ti_3O_{9+\delta}$ (x = 0.28) | 0.60 eV |

Figure 4:
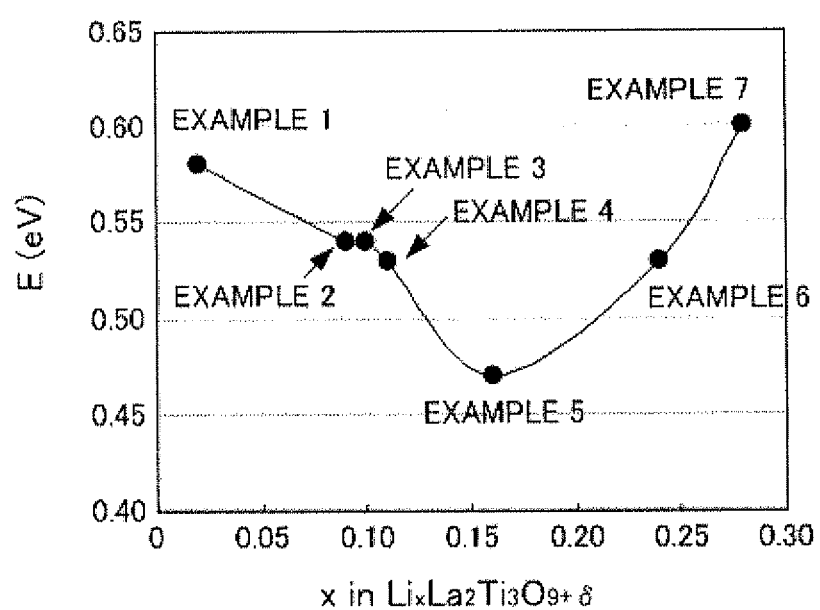
FIG. 4 is a result of activation energy of a solid electrolyte material obtained in Examples 1 to 7.

As shown in Table 1 and FIG. 4, the activation energy became 0.60 eV or less in Examples 1 to 7. In particular, when "x" became 0.09 or more, the activation energy decreased remarkably and minimized at x=0.16. In addition, it was confirmed that Example 6 also gave as low activation energy as Examples 2 to 4. As described above, it was confirmed that a solid electrolyte material of the present invention exhibited excellent Li ion conductivity for the reason that smaller activation energy E brought larger Li ion conductivity σ.

Reference Example 1

A thin-film solid electrolyte material was obtained in the same manner as in Example 1 except for properly adjusting the amount of the metals volatilized from the crucible with a shutter. The composition of the solid electrolyte material obtained in Reference Example 1 was $Li_{0.42}La_{0.58}TiO_3$. This composition is included in a composition area described in Patent Literature 1, and differs from the composition in the present invention. Further, the difference is that the solid electrolyte material described in Patent Literature 1 is amorphous while the solid electrolyte material obtained in Reference Example 1 is a crystalline material.

Reference Example 2

A thin-film solid electrolyte material was obtained in the same manner as Example 1 except for properly adjusting the amount of the metals volatilized from the crucible with a shutter. The composition of the solid electrolyte material obtained in Reference Example 2 was $Li_{0.09}La_{0.64}TiO_3$. This composition is included in a composition area described in Patent Literature 2, and differs from the composition in the present invention. Further, the difference is that the solid electrolyte material described in Patent Literature 2 is a bulk body while the solid electrolyte material obtained in Reference Example 2 is in thin film form.

[Evaluation 2]

Activation energy of Li ion conduction in the solid electrolyte materials obtained in Reference Examples 1 and 2 was evaluated. The evaluation method is the same as the above. The result is shown in Table 2.

TABLE 2

|  | CHEMICAL FORMULAE | ACTIVATION ENERGY |
| --- | --- | --- |
| REFERENCE EXAMPLE 1 | $Li_{0.42}La_{0.58}TiO_3$ | 0.61 eV |
| REFERENCE EXAMPLE 2 | $Li_{0.09}La_{0.64}TiO_3$ | 0.62 eV |

As shown in Table 2, the activation energy became more than 0.60 eV in Reference Examples 1 and 2. Further, in particular, it was confirmed that the activation energy was lower in Examples 2 to 6 when Reference Examples 1 and 2 were compared with Examples 2 to 6.

REFERENCE SIGNS LIST

1 ... cathode active material layer
2 ... anode active material layer
3 ... solid electrolyte layer
4 ... cathode current collector
5 ... anode current collector
6 ... battery case
10 ... lithium battery
11 ... chamber
12 ... crucible
13 ... substrate
14 ... LiLaTiO thin film

The invention claimed is:

1. A solid electrolyte material represented by a general formula: $Li_x(La_{2-a}M1_a)(Ti_{3-b}M2_b)O_{9+\delta}$,
wherein
"x" is $0.02 \leq x \leq 0.28$;
"a" is $0 \leq a \leq 2$;
"b" is $0 \leq b \leq 3$;
"δ" is $-2 \leq \delta \leq 2$;
"M1" is at least one selected from the group consisting of Sr, Na, Nd, Pr, Sm, Gd, Dy, Y, Eu, Tb, and Ba; and
"M2" is at least one selected from the group consisting of Mg, W, Mn, Al, Ge, Ru, Nb, Ta, Co, Zr, Hf, Fe, Cr, and Ga.

2. The solid electrolyte material according to claim 1, wherein the "x" is $0.09 \leq x \leq 0.24$.

3. The solid electrolyte material according to claim 1, wherein the solid electrolyte material is a crystalline material.

4. The solid electrolyte material according to claim 1, wherein the solid electrolyte material has a perovskite structure.

5. The solid electrolyte material according to claim 1, wherein the solid electrolyte material is in thin film form.

6. The solid electrolyte material according to claim 1, wherein the solid electrolyte material has a thickness of 200 nm to 5 μm.

7. The solid electrolyte material according to claim 1, wherein the "a" and the "b" are 0.

8. A lithium battery comprising:
a cathode active material layer containing a cathode active material,
an anode active material layer containing an anode active material, and
a solid electrolyte layer formed between the cathode active material layer and the anode active material layer,
wherein the solid electrolyte layer contains the solid electrolyte material of claim 1.

9. A method of producing a solid electrolyte material comprising steps of:
preparing a raw material, in which the raw material is made of Li, La, Ti, M1(M1 being at least one selected from the group consisting of Sr, Na, Nd, Pr, Sm, Gd, Dy, Y, Eu, Tb, and Ba), and M2 (M2 being at least one selected from the group consisting of Mg, W, Mn, Al, Ge, Ru, Nb, Ta, Co, Zr, Hf, Fe, Cr, and Ga); and
forming a thin film, in which a solid electrolyte material is formed using the raw material to a substrate by a reactive deposition method using an oxygen, and the solid electrolyte material is represented by a general formula: $Li_x(La_{2-a}M1_a)(Ti_{3-b}M2_b)O_{9+\delta}$, "x" being $0.02 \leq x \leq 0.28$ and "a" being $0 \leq a \leq 2$, "b" is $0 \leq b \leq 3$, and "δ" is $-2 \leq \delta \leq 2$.

10. The method of producing a solid electrolyte material according to claim 9, wherein the solid electrolyte material is a crystalline material and has a perovskite structure.

11. The method of producing a solid electrolyte material according to claim 9, wherein the solid electrolyte material has a thickness of 200 mn to 5 μm.

12. The method of producing a solid electrolyte material according to claim 9, wherein the solid electrolyte material is formed in the thin film forming step by the reactive deposition method using an oxygen plasma.

13. The method of producing a solid electrolyte material according to claim 9, wherein the substrate is a member containing a cathode active material layer or an anode active material layer.

* * * * *